United States Patent
Bhamri et al.

(10) Patent No.: US 12,156,188 B2
(45) Date of Patent: Nov. 26, 2024

(54) USER EQUIPMENT AND SCHEDULING DEVICE

(71) Applicant: Panasonic Intellectual Property Corporation of America, Torrance, CA (US)

(72) Inventors: Ankit Bhamri, Rödermark (DE); Hidetoshi Suzuki, Kanagawa (JP); Xuan Tuong Tran, Singapore (SG); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 312 days.

(21) Appl. No.: 17/572,378

(22) Filed: Jan. 10, 2022

(65) Prior Publication Data

US 2022/0132506 A1 Apr. 28, 2022

Related U.S. Application Data

(63) Continuation of application No. PCT/EP2020/072464, filed on Aug. 11, 2020.

(30) Foreign Application Priority Data

Aug. 14, 2019 (EP) .................................... 19191793

(51) Int. Cl.
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC ............. H04W 72/0453; H04W 72/23; H04W 72/1273; H04L 5/0023; H04L 5/0053
See application file for complete search history.

(56) References Cited

U.S. PATENT DOCUMENTS

2019/0222281 A1  7/2019  Sirotkin et al.
2020/0221429 A1  7/2020  Li et al.
(Continued)

FOREIGN PATENT DOCUMENTS

WO     2019/0151242 A2    3/2019
WO    WO 2019093768 A1    5/2019
WO    WO 2019137441 A1    7/2019

OTHER PUBLICATIONS

3GPP, "3rd Generation Partnership Project; Technical Specification Group Radio Access Network; Scenarios and requirements for small cell enhancements for E-UTRA and E-UTRAN (Release 15)," 3GPP TR 36.932 V15.0.0, Jun. 2018, 14 pages.

(Continued)

*Primary Examiner* — Thai Nguyen
(74) *Attorney, Agent, or Firm* — Seed IP Law Group LLP

(57) ABSTRACT

The present disclosure relates to a user equipment (UE) and a scheduling node, as well as to the corresponding methods. In particular, a downlink control information (DCI) signaling carries a Transmission Configuration Indication (TCI) indicator specifying that two or more TCI states are configured and a frequency-domain resource assignment indicating frequency-domain resources allocated for the two or more TCI states. For each TCI state of the two or more TCI states, one or more regions in frequency domain is/are determined, each region having an integer multiple of a precoding resource block group (PRG), said integer being equal to or larger than 1, wherein regions of different TCI states do not overlap. The data are received or transmitted for each TCI state on the frequency-domain resources in the determined frequency-domain region.

13 Claims, 9 Drawing Sheets

(56) References Cited

U.S. PATENT DOCUMENTS

2020/0314881 A1* 10/2020 Bagheri ............... H04W 72/23
2020/0404667 A1* 12/2020 Khoshnevisan ...... H04W 72/23

OTHER PUBLICATIONS

3GPP, "3rd Generation Partnership Project; Technical Specification Group Services and System Aspects; System Architecture for the 5G System; Stage 2 (Release 16)," 3GPP TS 23.501 V16.1.0, Jun. 2019, 368 pages.

3GPP, "3rd Generation Partnership Project; Technical Specification Group Radio Access Network; NR; Physical layer procedures for data (Release 15)," 3GPP TS 38.214 V15.4.0, Jun. 2019 105 pages.

3GPP, "3rd Generation Partnership Project; Technical Specification Group Radio Access Network; NR; Multiplexing and channel coding (Release 15)," 3GPP TS 38.212 V15.6.0, Jun. 2019, 101 pages.

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019, 99 pages.

3GPP, "3rd Generation Partnership Project; Technical Specification Group Radio Access Network; NR; Physical channels and modulation (Release 15)," 3GPP TS 38.211 V15.3.0, Sep. 2018, 96 pages.

3GPP, "3rd Generation Partnership Project; Technical Specification Group Radio Access Network; NR; Physical channels and modulation (Release 15)," 3GPP TS 38.211 V15.6.0, Jun. 2019, 97 pages.

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018, 39 pages.

3GPP, "3rd Generation Partnership Project; Technical Specification Group Radio Access Network; Study on new radio access technology: Radio access architecture and interfaces (Release 14)," 3GPP TR 38.801 V14.0.0, Mar. 2017, 91 pages.

Extended European Search Report, mailed Feb. 2, 2020, for corresponding European Application No. 19191793.9-1215, 12 pages.

International Search Report, mailed Sep. 28, 2020, for corresponding International Application No. PCT/EP2020/072464, 4 pages.

Panasonic, "On multi-TRP enhancements for NR MIMO in Rel. 16," R1-1907031, Agenda Item: 7.2.8.2, 3GPP TSG RAN WG1 Meeting #97, Reno, USA, May 13-17, 2019, 16 pages.

Qualcomm Incorporated, "Multi-TRP Enhancements," R1-1905026, Agenda Item: 7.2.8.2, 3GPP TSG-RAN WG1 Meeting #96b, Xi'an, China, Apr. 8-12, 2019, 29 pages.

Communication Pursuant to Article 94(3) EPC dated Apr. 23, 2024, for corresponding EP Application No. 20751573.5, 6 pages.

LG Electronics, "Remaining issues on search space," R1-1804551, Agenda item: 7.1.3.1.2, 3GPP TSG RAN WG1 Meeting #92bis, Sanya, China, Apr. 16-20, 2018. (4 pages).

Notice for Reasons for Rejection, dated Jun. 18, 2024, for Japanese Application No. 2022-508593. (8 pages) (with English Translation).

Qualcomm Incorporated, "Multi-TRP Enhancements," R1-1907289, Agenda item: 7.2.8.2, 3GPP TSG-RAN WG1 Meeting #97, Reno, Nevada, USA, May 13-17, 2019. (25 pages).

ZTE, "Enhancements on Multi-TRP and Multi-panel Transmission," R1-1904013, Agenda item: 7.2.8.2, 3GPP TSG RAN WG1 #96bis, Xi'an, China, Apr. 8-12, 2019. (13 pages).

* cited by examiner

USER EQUIPMENT AND SCHEDULING DEVICE

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE, LTE-A, and NR, further modifications and options may facilitate efficient operation of the communication system as well as particular devices pertaining to the system.

BRIEF SUMMARY

One non-limiting and exemplary embodiment facilitates efficiently utilizing resources including an efficient signaling of frequency-domain resources for multiple transmission/reception points (TRPs), i.e., for multiple transmission configuration indication (TCI) states.

In an embodiment, the techniques disclosed herein feature a user equipment, UE, comprising a transceiver, which in operation, receives downlink control information, DCI, signaling, and a processor, which in operation obtains from the DCI signaling: a Transmission Configuration Indication, TCI, indicator specifying that two or more TCI states are configured; and a frequency-domain resource assignment indicating frequency-domain resources allocated for the two or more TCI states, determines for each TCI state of the two or more TCI states one or more regions in frequency domain, each region having an integer multiple of a precoding resource block group, PRG, said integer being equal to or larger than one, wherein regions of different TCI states do not overlap, wherein the transceiver, in operation, receives or transmits for each TCI state data on the frequency-domain resources in the determined frequency-domain region.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

DETAILED DESCRIPTION

5G NR System Architecture and Protocol Stacks

3GPP has been working at the next release for the 5$^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
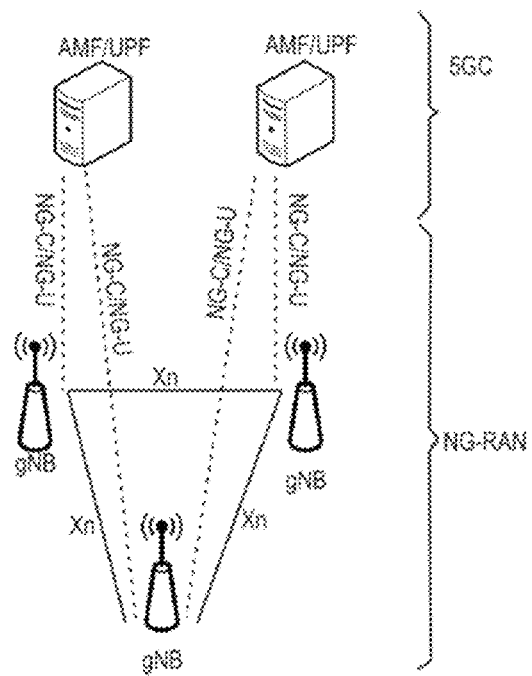
FIG. 1 is a schematic drawing showing an exemplary architecture for a 3GPP NR system.

Among other things, the overall system architecture assumes an NG-RAN (Next Generation—Radio Access Network) that comprises gNBs, providing the NG-radio access user plane (SDAP/PDCP/RLC/MAC/PHY) and control plane (Radio Resource Control, RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

Figure 2:
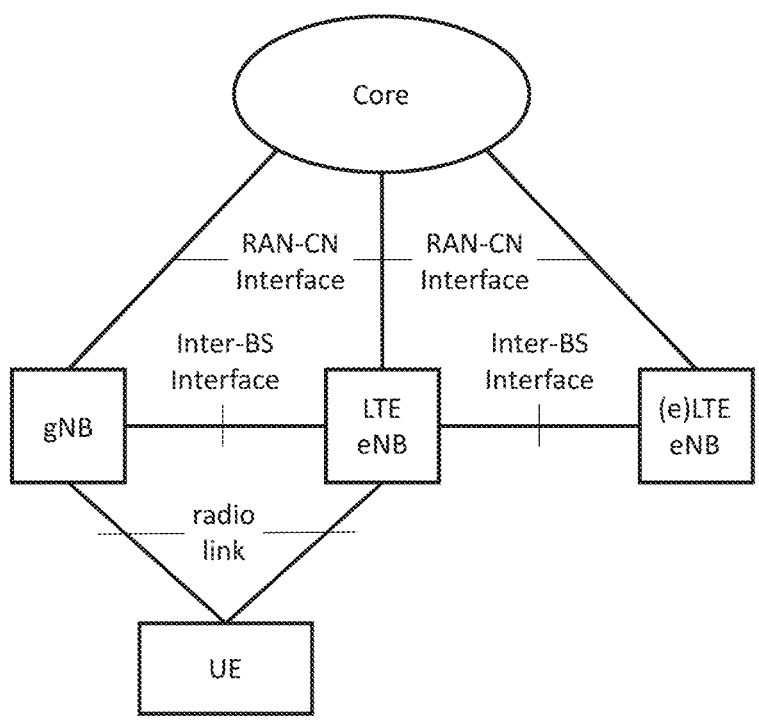
FIG. 2 is a block diagram which shows an exemplary user and control plane architecture for the LTE eNB, gNB, and UE.

Various different deployment scenarios can be supported (see, e.g., 3GPP TR 38.801 v 14.0.0). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-$10^{-5}$ within 1 ms). Finally, mMTC may preferably require high connection density (1,000,000 devices/$km^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v 15.6.0).

5G NR Functional Split Between NG-RAN and 5GC

Figure 3:
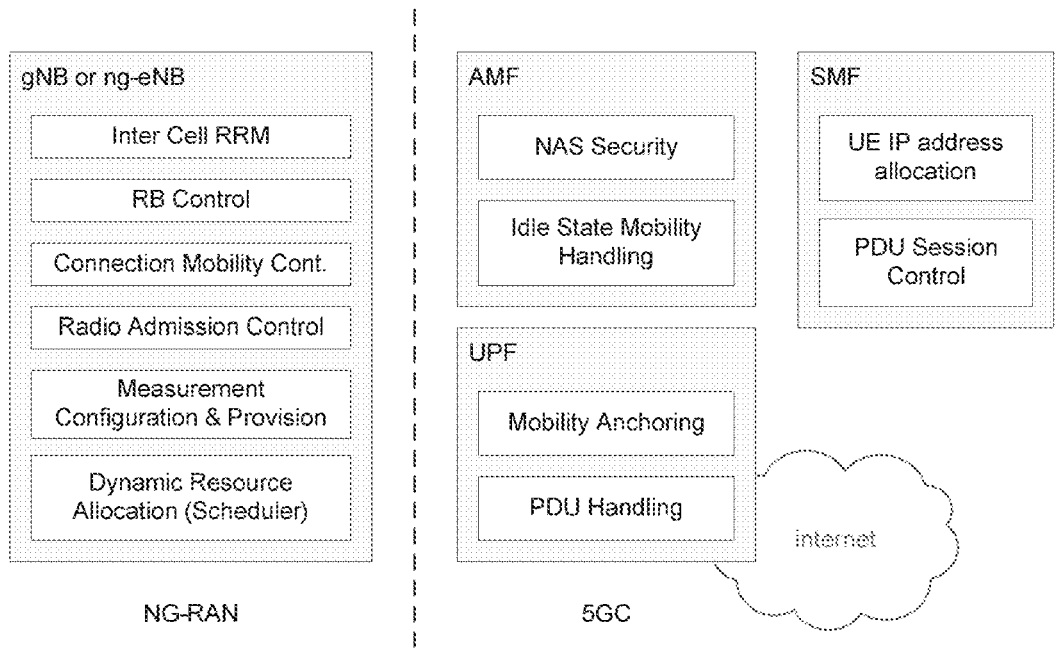
FIG. 3 is a schematic drawing which shows functional split between NG-RAN and 5GC.

FIG. 3 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) hosts the following main functions:

Non-Access Stratum, NAS, signaling termination;

NAS signaling security;

Access Stratum, AS, Security control;

Inter Core Network, CN, node signaling for mobility between 3GPP access networks;

Idle mode UE Reachability (including control and execution of paging retransmission);

Registration Area management;

Support of intra-system and inter-system mobility;
Access Authentication;
Access Authorization including check of roaming rights;
Mobility management control (subscription and policies);
Support of Network Slicing;
Session Management Function, SMF, selection.

Furthermore, the User Plane Function, UPF, hosts the following main functions:
Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g., packet filtering, gating, UL/DL rate enforcement;
Uplink Traffic verification (SDF to QoS flow mapping);
Downlink packet buffering and downlink data notification triggering.

Finally, the Session Management function, SMF, hosts the following main functions:
Session Management;
UE IP address allocation and management;
Selection and control of UP function;
Configures traffic steering at User Plane Function, UPF, to route traffic to proper destination;
Control part of policy enforcement and QoS;
Downlink Data Notification.

RRC Connection Setup and Reconfiguration Procedures

Figure 4:
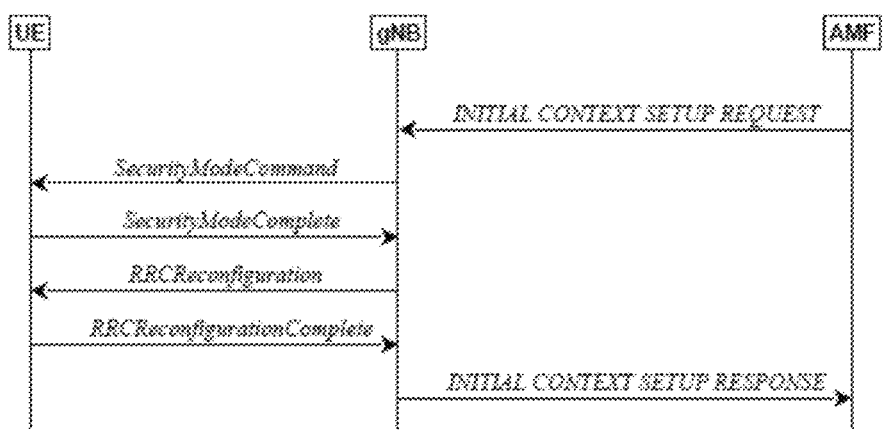
FIG. 4 is a sequence diagram for RRC connection setup/reconfiguration procedures.

FIG. 4 illustrates some interactions between a UE, gNB, and AMF (an 5GC entity) in the context of a transition of the UE from RRC_IDLE to RRC_CONNECTED for the NAS part (see TS 38.300 v 15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB (or gNB), and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 5:
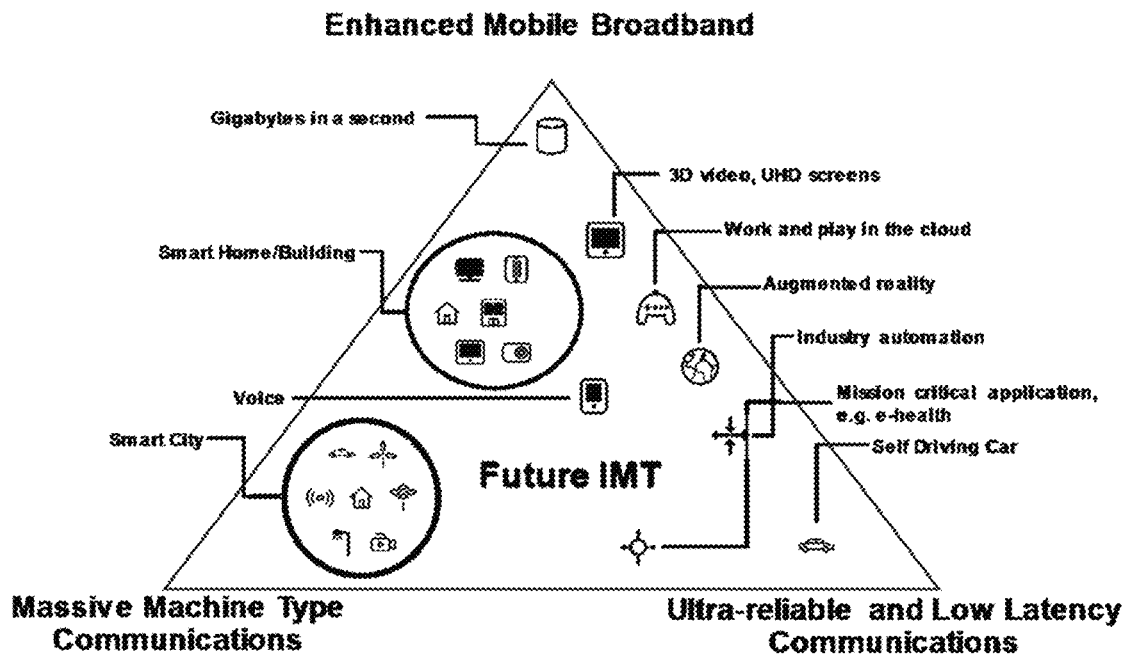
FIG. 5 is a schematic drawing showing usage scenarios of Enhanced mobile broadband, Massive Machine Type Communications (mMTC) and Ultra Reliable and Low Latency Communications (URLLC)

FIG. 5 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 5 illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From RAN1 perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLCC in Rel. 15 include Augmented Reality/Virtual Reality (AR/VR), e-health, e-safety, and mission-critical applications.

Moreover, technology enhancements targeted by NR URLCC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS (channel quality information/modulation and coding scheme) tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to 10-6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLCC, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen or twelve symbols).

In slot-based scheduling or assignment, a slot corresponds to the timing granularity (TTI—transmission time interval) for scheduling assignment. In general, TTI determines the timing granularity for scheduling assignment. One TTI is the time interval in which given signals is mapped to the physical layer. For instance, conventionally, the TTI length can vary from 14-symbols (slot-based scheduling) to 2-symbols (non-slot based scheduling). Downlink (DL) and uplink (UL) transmissions are specified to be organized into frames (10 ms duration) consisting of 10 subframes (1 ms duration). In slot-based transmission, a subframe is further divided into slots, the number of slots being defined by the numerology/subcarrier spacing. The specified values range between 10 slots per frame (1 slot per subframe) for a subcarrier spacing of 15 kHz to 80 slots per frame (8 slots per subframe) for a subcarrier spacing of 120 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.3.0, Physical channels and modulation, 2018-09). However, assignment of time resources for transmission may also be non-slot based. In particular, the TTIs in non slot-based assignment may correspond to mini-slots rather than slots, i.e., one or more mini-slots may be assign to a requested transmission of data/control signaling. In non slot-based assignment, the minimum length of a TTI may for instance be 1 or 2 OFDM symbols.

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 4. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 6:
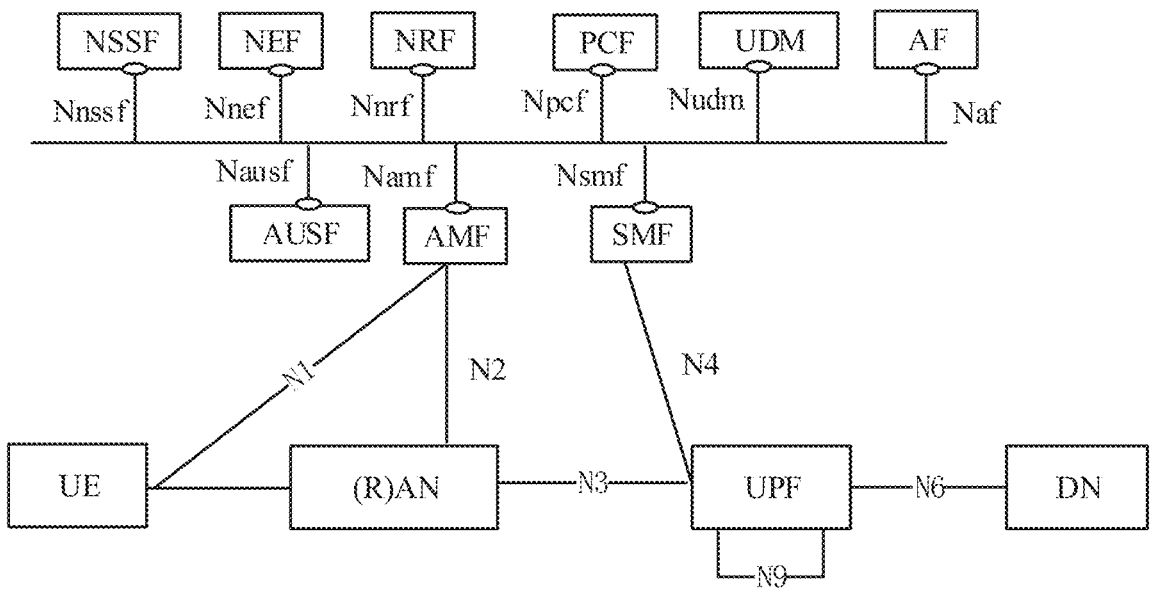
FIG. 6 is a block diagram which shows an exemplary 5G system architecture.

FIG. 6 illustrates a 5G NR non-roaming reference architecture (see TS 23.501 v16.1.0, section 4.23). An Application Function (AF), e.g., an external application server hosting 5G services exemplary described in FIG. 5, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 6 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services.

A terminal or user terminal, or user device is referred to in the LTE and NR as a user equipment (UE). This may be a mobile device or communication apparatus such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node, e.g., forming a part of the network for providing services to terminals. A base station is a network node or scheduling device, which provides wireless access to terminals. Communication between the terminal and the base station is typically standardized. In LTE and NR, the wireless interface protocol stack includes physical layer, medium access layer (MAC) and higher layers. In control plane, higher-layer protocol Radio Resource Control protocol is provided. Via RRC, the base station can control configuration of the terminals and terminals may communicate with the base station to perform control tasks such as connection and bearer establishment, modification, or the like, measurements, and other functions. The terminology used in LTE is eNB (or eNodeB), while the currently used terminology for 5G NR is gNB.

Services for transfer of data provided by a layer to the higher layers are usually referred to as channels. For example, the LTE and the NR distinguish logical channels provided for higher layers by the MAC layer, transport channels provided by the physical layer to the MAC layer and physical channels which define mapping on the physical resources.

Logical channels are different kinds of data transfer services as offered by MAC. Each logical channel type is defined by what type of information is transferred. Logical channels are classified into two groups: Control Channels and Traffic Channels. Control channels are used for the transfer of control plane information only. Traffic channels are used for the transfer of user plane information only.

Logical Channels are then mapped by the MAC layer onto transport channels. For example, logical traffic channels and some logical control channels may be mapped onto the transport channel referred to as downlink shared channel DL-SCH in downlink and onto the transport channel referred to as uplink shared channel UL-SCH in uplink.

Downlink Control Channel Monitoring, PDCCH, DCI

Many of the functions operated by the UE involve the monitoring of a downlink control channel (e.g., the PDCCH, see 3GP TS 38.300 v 15.6.0, section 5.2.3) to receive, e.g., particular control information or data destined to the UE.

As mentioned above, the PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (can be termed downlink control information, DCI) has the same purpose in 5G NR as the DCI in LTE, namely being a special set of control information that e.g. schedules a downlink data channel (e.g. the PDSCH) or an uplink data channel (e.g., PUSCH). In 5G NR there are a number of different DCI Formats defined already (see TS 38.212 v 15.6.0 section 7.3.1).

The PDCCH monitoring of each of these functions serves a particular purpose and is thus started to said end. The PDCCH monitoring is typically controlled at least based on a timer, operated by the UE. The timer has the purpose of controlling the PDCCH monitoring, e.g., limiting the maximum amount of time that the UE is to monitor the PDCCH. For instance, the UE may not need to indefinitely monitor the PDCCH, but may stop the monitoring after some time so as to be able to save power.

As mentioned above, one of the purposes of DCI of the PDCCH is the dynamic scheduling of resources in downlink or uplink or even sidelink. In particular, some formats of DCI are provided to carry indication of resources (resource allocation, RA) allocated to a data channel for a particular user. The resource allocation may include specification of resources in frequency domain and/or time domain.

Resource Allocation

In Release 15 of NR, two types of frequency domain resource allocation schemes, type 0 and type 1, are used, both signaling the allocation across the active bandwidth part (BWP).

Type 0 is a bitmap-based allocation scheme. The most flexible way of indicating the set of allocated resource blocks is to include a bitmap with size equal to the number of resource blocks in the BWP. A resource block corresponds to a smallest allocable unit for transmission of data and is defined by the number of subcarriers in frequency. (Note that the NR definition of a resource block differs from the LTE definition. An NR physical resource block is a one-dimensional measure spanning the frequency domain only, while LTE uses two-dimensional resource block of 12 subcarriers in frequency and one slot in time.) This would allow for an arbitrary combination of resource blocks to be scheduled for transmission but would, unfortunately, also result in a very large bitmap for the larger bandwidths. Therefore, the bitmap in type 0 resource allocation scheme is used to point not to individual resource blocks, but to groups of contiguous resource blocks, called RBG. The size of RBG depends on the size of active BWP. For instance, two different configurations are possible for each size of the BWPs, as defined by 3GPP TS 38.214 V15.4.0 and summarized in table 1.

TABLE 1

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

As can be seen from table 1, for instance, a RBG allocated according to type 0 with the bandwidth size of a BWP corresponding to a number of RBs from 1 to 36 contains two RBs when applying configuration 1. Accordingly, for instance, a RBG allocated according to type 0 with a BWP size corresponding to a number of RBs from 73 to 144 contains 16 RBs when applying configuration 2. That is, the number of RBs within a RBG depends on the bandwidth of the active BWP.

Type 1 resource allocation scheme does not rely on a bitmap. Instead, it uses a resource indication value (MV), which encodes the resource allocation as a starting position and length of the allocation in terms of number of resource blocks. Thus, it does not support arbitrary allocation of resource blocks but only frequency-contiguous allocation, thereby reducing the number of bits required for signaling the resource block allocation.

Both resource allocation types refer to virtual resource blocks, VRBs. For type 0, a non-interleaved mapping from virtual to physical resource block is used, meaning that the virtual resource blocks are directly mapped to the corresponding physical resource blocks. On the other hand, for type 1 resource allocation scheme, non-interleaved mapping is supported for UL. For DL, both interleaved and non-interleaved mapping is supported for type 1 resource allocation scheme, wherein the interleaving size is the bandwidth of the active BWP.

In time domain, as for instance specified in Release 15 (NR), the scheduling timing (e.g., for the scheduling of resources described above) may be indicated within the DCI by using a Time Domain Resource Allocation (TDRA) table. In particular, a UE may be notified of allocated resources in time domain by indicating one entry (a row) of said TDRA table in the DCI, for instance, by signaling an entry (row) index. The term table is used herein as a logical term, as the TDRA entries are summarized, for NR, as a table in a standard specification.

Repetitions on PDSCH and PUSCH

The transmissions in NR may include spontaneous (i.e., without being triggered by an (H)ARQ) repetitions of data. In such case, the same data (e.g., transport block) is transmitted N times, N being an integer larger than one. The number of repetitions may be configurable.

Multiple Transmission/Reception Points, TRP

The physical layer in NR may provide multi-antenna operation such as MIMO (multiple input, multiple output)

which may, for instance, include the use of plural or multiple transmission and reception points (multi-TRP). For instance, user equipment may receive data from plural TRPs (transmission and reception points), wherein the plural-TRPs may be controlled by the same or different network nodes. The terms multi-point transmission or coordinated multi-point transmission (CoMP) may also be used for multi-TRP communication or transmission.

The technologies described in the present disclosure are not limited to a particular arrangement of TRPs, or a particular relationship between TRPs and gNBs. Accordingly, for instance, multi-TRP operation may be performed by a gNB having different antenna panels or radio heads corresponding to the TRPs and different radio frequency units operating with the respective antennas.

Moreover, in multi-TRP, several options are conceivable with respect to the positional relationship between TRPs, and the distance between two TRPs may vary. For instance, the TRPs may be close, so that a UE receives signals from these TRPs from a similar angle. However, TRPs may also be located at a rather far distance from each other, for instance at remote locations of a network cell. A UE being served by the two TRPs may receive and transmit the signaling from and to the respective TRPs on uncorrelated channels. Accordingly, gains in channel diversity may be optimally utilized.

For instance, multi-TRP may be categorized into two high-level categories. Namely, the distinction between the categories may be made with respect to the backhaul type of the backhaul link between two given TRPs.

On the one hand, an ideal backhaul is a very high throughput and very low latency backhaul such as dedicated point-to-point connection using, e.g., optical fiber. An ideal backhaul is assumed to allow for communication between the TRPs with approximately or almost 0 ms delay (e.g., for LTE-A, technical report 3GPP TR 36.932 V15.0.0 (2018-06) mentions in section 6.1.3 a one-way latency of less the 2.5 us wherein, however, propagation delay in the fiber/cable is not included).

On the other hand, a non-ideal backhaul is a backhaul such as DSL, microwave, and other backhauls like relaying, and may for example involve finite (one-way) delays in the range of 2 ms or 5 ms for communication between the two given TRPs.

Apart from the categorization into ideal backhauls and non-ideal backhauls, a further categorization in multi-TRP MIMO technology may be made with respect to how (central) baseband units are shared between TRPs.

For instance, while there are different RF (radio frequency) units for each of two given TRPs, the TRPs may share the same baseband unit. Therein, the link between the RF units and the baseband unit may be ideal or non-ideal. Alternatively, there may be both different (central) baseband units and different RF units for each TRP. Therein, the respective links between baseband units and RF units as well as the link between the different baseband units may be ideal or non-ideal.

The present disclosure provides approaches which may facilitate multi-TRP operation and may particularly facilitate scheduling of frequency-domain resources for multi-TRP operation. The technologies disclosed may for instance facilitate URLLC use cases, but also or alternatively, eMBB and mMTC use cases. The present disclosure is applicable to scenarios including one or both of ideal and non-ideal backhauls.

As mentioned above, multiple and far apart TRPs may allow for providing spatial diversity gains. The exploitation of these spatial diversity gains may in particular facilitate transmission and reception in a range of high frequencies where blockage for any of the links or wireless communication channels between a TRP and a UE is particularly possible.

Recently, it has been discussed to schedule same transport block, TB, from two TRPs on respective non-overlapped frequency regions and on same time symbols, using single-DCI based scheduling from one of the two TRPs. Transport block denotes a unit of data passed to the physical layer for transmission.

It is understood that each TRP transmission (i.e., transmission from one TRP) on the corresponding non-overlapped frequency region can be associated with separate TCI state. In particular, each TRP can be associated with a separate TCI state. Thus, the terms "TCI state" and "TRP" can be inter-changeably used—for example, TCI state 1 will refer to TRP 1, TCI state 2 will refer to TRP 2 and so on.

It is under consideration to support different MCS for the transmission of the same TB from different TRPs, which can depend up on the respective channel conditions from each TRP to UE. If different MCSs are used, then unequal size of frequency regions from the two TRPs may be advantageous. Ideal backhaul may be considered between multiple TRPs. However, these are merely some optional deployment scenarios and the present disclosure is not limited to them.

For example, in order to schedule the same TB of a PDSCH and multiplex them in two non-overlapped frequency regions belonging to multiple different TRPs by a single DCI from one of the TRPs, the following issues were recognized by the inventors and addressed by the present disclosure. A first issue is how to distribute and indicate multiple non-overlapped frequency regions using a single-DCI based scheduling. A second issue is how to associate the distributed non-overlapped frequency regions to the indicated TCI states. Furthermore, several other optimizations and improvements may be provided to increase the efficiency and/or scalability of the resource signaling.

In order to address some of the above-mentioned issues, according to an embodiment, physical resource blocks in the frequency domain are assigned to regions. Each region is defined as multiple of precoding resource block groups (PRGs). Each region is associated with transmissions corresponding to a separate, particular TCI state.

Here, each TCI state (TRP) is associated with one or more regions. Each region is associated with only one TCI state and the regions are not overlapping. A precoding block group is a group of (physical) resource blocks which share the same precoding. For example, a precoding resource block group applies the same precoding matrix.

One of the benefits of defining regions in a multiple of PRGs and assigning them to different TRPs is to allow separate precoding for each TRP transmission. Such approach is applicable to both resource allocation type 0 and type 1, without any impact on these respective schemes.

In the this example it was mentioned that the same TB is transmitted over the multiple TRPs (with multiple TCI states). However, the present disclosure is not limited thereto, and, in general, the solution can be applied to the transmission of different TBs via different respective TCI states as well. Moreover, in the following, for the sake of simplicity, examples are shown in which there are two TRPs. However, the solutions discussed here are applicable to more than two TRPs.

Figure 7:
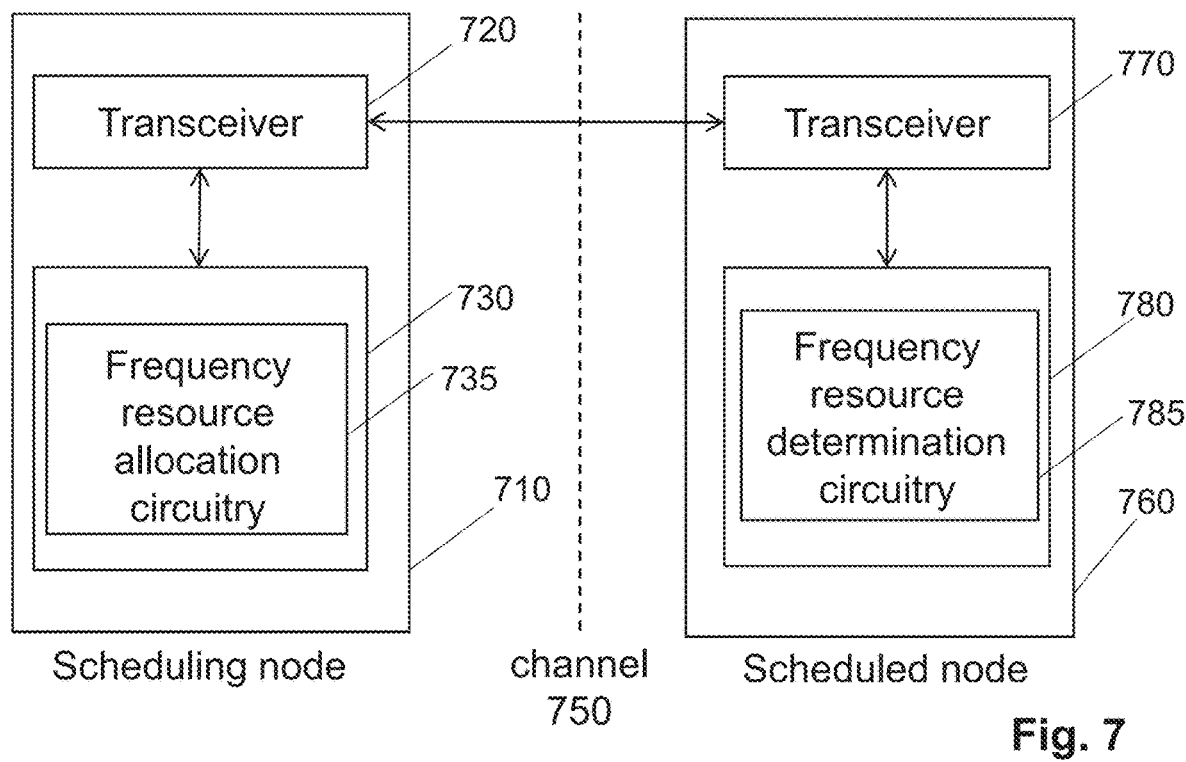
FIG. 7 is a block diagram which shows a user equipment (UE) and a scheduling device (base station) communicating over wireless channel.

The present disclosure provides exemplary embodiments including devices and methods. For example, FIG. 7 shows exemplary user equipment, UE, 760 comprising a transceiver 770 which, when in operation, receives downlink control information, DCI, over a channel 750 (illustrated by a dashed line). The UE (corresponding to a terminal or, in general, to a scheduled device) 760 also comprises circuitry 780. The circuitry is a processing circuitry (processor) and may be implemented on one chip or on several chips and further electronic elements. The term "processor" is to be understood functionally and may comprise one or more general purpose processors, digital signal processors, programmable hardware, and/or specialized hardware. The circuitry (processor) 780, in operation, obtains from the DCI signaling a Transmission Configuration Indication, TCI, indicator specifying that two or more TCI states are configured and a frequency-domain resource assignment indicating frequency-domain resources allocated for the two or more TCI states.

For example, the transceiver 770 performs blind decoding the PDCCH in order to identify whether or not there is a DCI directed to the UE 760. If there is a DCI for the UE, the processor 780 parses (extracts), from the DCI, various signaling parameters, in accordance with the syntax and semantic of the DCI known at the UE, as well as at the scheduling device 710 which generated the DCI. The syntax and semantic may be defined by a standard such as the NR or other standard. The syntax and semantic of the DCI may also be configurable entirely or in part by higher-layer signaling. In general, the DCI may include one or more bit-fields, each bit-field including one or more bits. Typically, the number of bits per field is statically (by standard or by network operator) or semi-statically (by higher-layer signaling such as the RRC) configured. One bit-field may indicate one transmission parameter, or several transmission parameters jointly coded.

For example, the above mentioned TCI indicator can be one separate bit (one bit-field having a length of one bit) indicating whether one or two TCI states are to be applied, or, in other words, whether one or two TRPs are to be used for the scheduled transmission (uplink) or reception (downlink). However, this exemplary implementation is only suitable if there may be at most two TRPs used at the same time. The present disclosure is not limited to such implementation. In other exemplary implementations, the TCI indicator may be carried by a separate DCI field, dedicated to the TCI indicator, which has more than one bits. In particular, such TCI indicator may signal how many TCI states (TRPs) are to be active for the scheduled transmission or reception.

Here it is assumed that the network provides one or more TRPs and thus, the TCI indicator specifies how many TRPs are to be active for the transmission or reception by the UE 760. The different TRPs may be located in the same base station or in different base stations. Even though it is easier to implement more TRPs at the network side which would typically have more power at its disposition, especially if the network side is one or more base stations or network nodes, in some scenarios a terminal (UE) may also profit from employing more than one TRPs. In such case, the embodiments and examples shown herein are also applicable. For example, the DCI may signal number of TRPs to be employed by the UE 760, in addition or alternatively to signaling how many TRPs are to be employed by the scheduling device 710. The term "scheduling device" in this disclosure is used interchangeably with the term base station and refers to a network node with scheduling functionality serving for UEs as access point to the network. It is noted that one scheduling device such as base station schedules multiple active TRPs, irrespectively of whether or not the TRPs actually are located/terminated at the scheduling device.

In general, the TCI indicator does not have to be indicated as a separate bit-field. It may be indicated jointly with another parameter or other parameters. In other words, one or more of codepoints of such joint bit-field may indicate that there is one TRP employed, while one or more other codepoints may indicate that there are two TRPs employed. Similarly, any number of TRPs may be signaled by one or more codepoints of a joint bit-field carrying such TCI indicator.

As mentioned above, the present disclosure provides specific frequency-domain resource assignment and signaling for the case when TCI indicator is specifying that two or more TCI states are configured. The DCI further carries frequency-domain resource assignment indicating frequency-domain resources allocated for the two or more TCI states. The frequency-domain resource assignment may be provided in a separate (dedicated) DCI bit-field or may be jointly coded with the TCI indicator and/or other one or more other transmission parameters.

In general, joint coding may provide for higher efficiency in utilization of the bits available in the DCI. In order to provide fast scheduling, the number of parameters and the length of the DCI may be kept as low as possible. On the other hand, coding in separate fields may provide for backward compatibility in some cases. Joint coding may be implemented, for example, by signaling, in the joint bit-field an index to a table which includes for each index a particular combination of parameter values, parameter corresponding to columns of the table. Examples of such tables are, for example, the TDRA table mentioned above, or a MCS table.

The circuitry 780 further determines, for each TCI state of the two or more TCI states, one or more regions in frequency domain. Each region has an integer multiple of a precoding resource block group, PRG. The integer is equal to or larger than one. In other words, each region may consist of (be composed of) one or more PRGs. The determination may be performed in accordance with the signaled frequency-domain resource assignment, e.g., the regions of the two or more TCI states are located within the frequency-domain resources specified by the frequency-domain resource assignment.

As mentioned above, the regions of different TCI states do not overlap. In other words, the regions are frequency-division multiplexed (FDM). In some embodiments, any of the regions do not overlap (not only those belonging to mutually different TCI states).

The circuitry 780 may implement more functionality than the above-mentioned determination of the frequency-domain resources for the transmission/reception employing more than one TRPs. Thus, the circuitry 780 is considered to include frequency resource determination circuitry 785 which is configured to perform the frequency-domain resource determination. The configuration may be provided by hardware adaption and/or by software.

Figure 8:
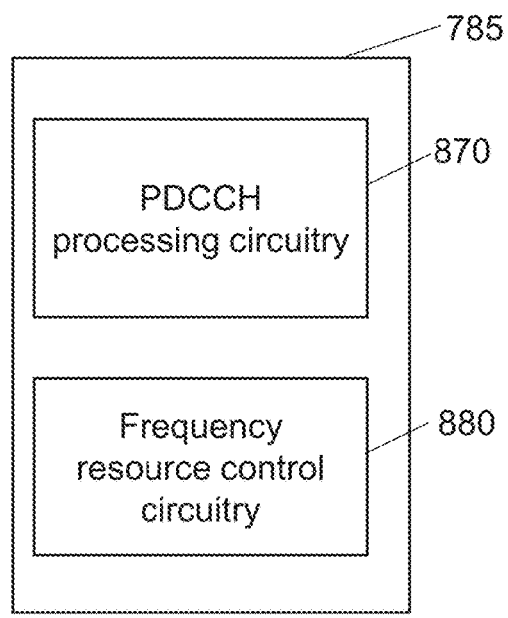
FIG. 8 is a block diagram which shows a functional structure of a user equipment (UE)

FIG. 8 shown functional structure of the frequency-resource determination circuitry 785. In particular, the frequency-resource determination circuitry 785 includes an PDCCH processing circuitry 870, which extracts from the DCI the TCI indicator and the frequency-domain assignment. The frequency-resource determination circuitry 785 further comprises the frequency resource control circuitry 880, which based on the assignment, when the TCI indicator indicates two or more TCI states, determines the regions and based on the regions, assignment of the allocated frequency resources to the respective TCI states. The processing circuitry may then control the transceiver 770 to receive or transmit data on the determined resources.

Following the determination of the regions, the transceiver 770, in operation, receives for each TCI state data on the frequency-domain resources in the determined frequency-domain region. This applies for the downlink case in which the DCI scheduled downlink resources for the UE to receive data. For the uplink case, the transceiver 770, in operation, transmits for each TCI state data on the frequency-domain resources in the determined frequency-domain region. A single UE can have transceiver which is receiver and transmitter and which receives and transmits data from/to multiple TRPs, depending on whether the DCI received is a downlink scheduling DCI or an uplink scheduling DCI.

Correspondingly to the UE 760, FIG. 7 shows a scheduling node 710. The scheduling device may be any network access node such as base station or gNB in case of the 5G-NR. According to an embodiment, the scheduling device 710 comprises a transceiver 720, which when in operation, transmits downlink control information, DCI, signaling. The transceiver 720 may have more than one antennas (e.g., an antenna panel) in order to provide for one or more TRPs. However, TRPs may also be provided by a plurality of different network nodes. As noted above, the UE 760 may also provide for more than one TRPs and so the transceiver 770 of the UE 760 may also include more than one antennas (antenna panels). The DCI may correspond in syntax and semantic to the DCI described above, in order to enable communication between the scheduling device 710 and the UE 760.

The scheduling device 710 further comprises a processor 730, which in operation provides DCI signaling including a Transmission Configuration Indication, TCI, indicator specifying that two or more TCI states are configured, and a frequency-domain resource assignment indicating frequency-domain resources allocated for the two or more TCI states. The above-described signaling possibilities for both the TCI indicator and the frequency-domain resource assignment apply. The processor 730 further determines for each TCI state of the two or more TCI states one or more regions in frequency domain, each region having an integer multiple of a precoding resource block group, PRG, said integer being equal to or larger than 1, wherein regions of different TCI states do not overlap. Accordingly, the transceiver 720, in operation, transmits (in case of downlink) or receives (in case of uplink) for each TCI state data on the frequency-domain resources in the determined frequency-domain region. Similarly to the processor 780 in the UE, the processor 730 may also perform various different tasks. The Frequency resource allocation circuitry 735 here denotes functional part of the processor 730 which performs the above-mentioned frequency-domain allocation tasks including determining the resources and providing the corresponding signaling to the UE 760.

The scheduling device may further include, as a part of the circuitry 730, allocation circuitry which performs scheduling of one UE or a plurality of UEs. As a result of the scheduling, the frequency domain resource assignment is generated and the corresponding DCI signaling is generated, indicating the TCI indicator and the assignment. The circuitry then controls the transceiver 720 to transmit or receive the data in the scheduled resources for the one or more UEs.

Figure 9:
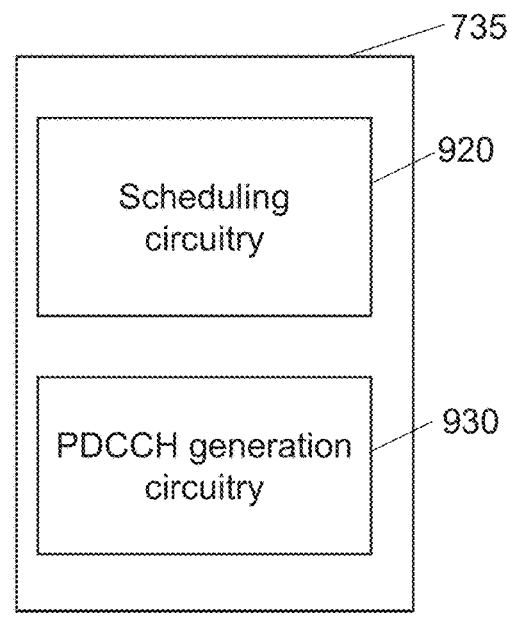
FIG. 9 is a block diagram which shows a functional structure of a network node.

An exemplary functional structure of the frequency resource allocation circuitry 735 is shown in FIG. 9. In particular, the frequency resource allocation circuitry 735 may comprise a scheduling circuitry 920 and a PDCCH generating circuitry 930. The scheduling circuitry 920 performs the scheduling, e.g., collects measurements from the one or more of the UEs and based thereon, based on the requests from the UEs and/or based on the availability of its resources, assigns to the respective UEs the resources in the frequency domain (and possibly also in the time domain, as well as the TRPs). The PDCCH generating circuitry 930 then generates the DCI including the TCI indicator and the resource assignment in accordance with the scheduling result for the respective one or more UEs.

As can be seen in FIG. 7, the UE 760 and the scheduling nose 710 can form a communication system, i.e., can be capable of communicating over the channel 750.

In the following, various embodiments are described, concerning the regions. In particular, one or more of the following configurations may be considered to define a region:

a) Number of regions: number of regions within the allocated frequency resources,
b) Assignment of regions: assignment of the regions to the physical layer resources (grid), e.g., onto the precoding resource block groups,
c) Size of regions: size of regions in terms of multiples of the PRGs, and
d) Association of regions: assignment of each region to one TRP (TCI state).

The above four configurations a) to d) can be configured and/or indicated in different ways.

It is noted that the regions may be configured and utilized only when more than one TCI states are indicated by a code-point of the bit-field for the TCI indication. However, the present disclosure is not limited thereto, and the concept of resource assignment may also be adopted for the single TRP case.

In NR, Rel. 16, it has been agreed to indicate two TCI states (instead of 1 TCI state in Rel. 15) using code-point of a TCI bit-field, which basically implies that two TRP transmissions are possible.

A. Determining Number of Regions

According to a first example, the processor 770 (and correspondingly also processor 730), in operation, determines the number (amount) of regions according to maximum number of TCI states which is configured semi-statically as possible to be indicated by one TCI in the DCI.

In other words, the UE determines the number of regions in a semi-static manner on the basis of the maximum number of TCI states that are semi-statically configured to be indicated by one index of TCI signaling.

In particular, the base station 710 may semi-statically configure, by sending to the UE 760 an RRC message, the RRC message indicating how many TCI states are dynamically configurable by the DCI. For example, the RRC message may signal that the maximum number of TCI states is 1. In such case, the DCI includes frequency resources only for a single TCI state (single TRP). For example, the RRC message may signal that the maximum number of TCI states is 2. In such case, the TCI indicator may signal either 1 or 2 TCI states to be applied for transmission/reception of data scheduled in the same DCI. For example, the RRC message may signal that the maximum number of TCI states is 3 or more. In such case, the DCI may dynamically signal any number 1, 2, 3, . . . up to the RRC-configured maximum of TCI states.

The resource assignment carried in the DCI is then interpreted according to the TCI indicator as covering frequency resources for the indicated number of TCI states. For example, in case maximum number of TCI states is 1, the entire allocated resources indicated by the frequency resource assignment belong to the transmission/reception using one TCI state. In case maximum number of TCI states is 2, there will be at least two different regions. In general, there will be two super-regions for the respective two TCI states. Each super-region may include a plurality of regions and may be continuous or discontinuous in frequency domain, as will be shown later on.

Determining the number of regions semi-statically may facilitate less complexity, as it does not have to be dynamically determined.

However, according to a second example, the processor 770, in operation, determines a number of regions according to maximum number of TCI states which is indicated by said TCI indicator. Correspondingly, the processor 730 of the base station determines the number of regions in compliance with the maximum number of TCI states which is indicated by said TCI indicator. The determination of the regions, their number, size, location with respect to the physical resources and their assignment to the respective TCI states may be determined by the scheduling circuitry 920 based on the quality/characteristics of the channel 750, UE capabilities, available resources in the cell handled by the base station 710, or the like.

In other words, the UE determines the number of regions in a dynamic manner on the basis of maximum number of TCI states that are dynamically indicated by TCI code-point in the DCI. In this example, the determination of the number of super-regions is performed dynamically. Thus, resources may be utilized more efficiently. For example, when the maximum number of TRPs indicated by the RRC is 2, but the current DCI indicates by the way of the TCI indicator that only a single TCI state is to be used for the transmission/reception of data scheduled by the same DCI, the number or regions will be determined for number of TCIs equal to 1. Actually, in this case, the regions do not have to be determined.

For example, when the maximum number of TRPs indicated by the RRC is 3, but the current DCI indicates by the way of the TCI indicator that only two TCI states are to be used for the transmission/reception of data scheduled by the same DCI, the number or regions will be determined for number of TCIs equal to 2.

It is noted that the maximum number of the TCIs does not have to be signaled/evaluated for the sake of this example. In particular, in this example, the number of the regions is determined based on the dynamic scheduling.

B. Region Mapping onto PRGs

In an example, the processor, in operation, assigns the regions to the respective integer multiples of PRGs in a semi-static manner, without considering dynamic resource allocation based on said DCI. For instance, the assignment may be performed starting at the beginning of the frequency resources indicated by the frequency-domain assignment in the DCI and associating each PRG to a particular one TCI state according to a predetermined pattern. There may be different patterns, as is explained below in more detail. For example, alternating pattern, in which PRGs are alternately assigned to the plurality of TCI states.

In other words, the UE assigns regions on common physical resource blocks (PRBs) in multiples of PRGs in a semi-static manner before resource allocation is done. Accordingly, the dynamic allocation may only refer to those regions which belong (according to the semi-static assignment) to the dynamically scheduled TCI states.

The combination of this embodiment, with the above-mentioned semi-statical determination of the number of regions may provide for simple and efficient implementation of the UE.

In another example, the processor, in operation, assigns the regions to the respective integer multiples of PRGs in accordance with said frequency-domain resource assignment. In this case, the assignment may facilitate more efficient resource usage, since only those regions are mapped onto the resources, which are actually currently scheduled. The combination of this embodiment, with the above-mentioned dynamic determination of the number of regions may provide for an efficient resource utilization.

In other words, in this example, the UE assigns regions on allocated physical resource blocks PRBs in multiples of precoding resource block groups (PRGs) in a dynamic manner after resource allocation is done.

C. Region Association Pattern

In a first example, the processor, in operation, associates the regions to the two or more TCI states according to a pre-configured pattern. The pre-configured pattern may be pre-configured statically (in standard, set by operator or the like), semi-statically (e.g., by RRC signaling), or dynamically by a code-point of a bit-field in the DCI.

The pre-configured pattern may correspond to round robin by alternating TCI state after each integer number M of consecutive regions, wherein M is not smaller than 1. Round robin refers to an approach according to which the TCI states in a predefined order are mapped cyclically onto the PRGs. A simple yet efficient way of mapping may be M=1. However, the present disclosure is not limited thereto and M may be larger than 1. In fact, there may be M1 and M2 defined for the respective two TCI states, M1 being different from M2. There may be a number of regions Mx defined for each of the x TCI states.

In other words, in this example, the UE associates each of the determined regions to indicated TCI states in a configurable pattern (static, semi-static or dynamic); for example by round-robin throughout the frequency region non-contiguously.

On the base station side, the processor 730 has to also map the regions onto the resources in the same way, in order to map the data to the resources in the correct way when transmitting or receiving the data.

According to a second example, the processor 780 (as well as processor 730), in operation, sequentially associates consecutive regions to each of the two or more TCI states. In other word, the UE (as well as the base station) associates each of the determined region to indicated TCI states contiguously first and then followed by next remaining regions. This can be seen as associating the entire super-regions (a super-region containing all regions pertaining to one TCI state), mapped consecutively on frequency resources allocated with the frequency-domain assignment received in the DCI, with the respective configured TCI states. One of the advantages of this approach may be the reduced complexity of multiplexing.

According to a third example, the processor 770 (and, correspondingly the processor 730), when in operation, associates a first part of the consecutive regions to the two or more TCI states according to said round robin (as in the first example) and a second part of the consecutive regions to one of the TCI states. In other words, the UE 760 (and, correspondingly the base station 710) associates each of the determined regions to the indicated TCI states in two steps where one step includes association in a round-robin manner that is non-contiguous and another step includes association of one super-region (remaining regions of one TCT state) to remaining PRGs contiguously. This approach may be advantageous especially for the cases with different MCS and/or different TBs mapped onto respective different TCI states.

According to a fourth example, the pre-configured pattern is received within semi-static or dynamic signaling as a bitmap with each bit of the bitmap representing a region, a first value of a bit indicates a first TCI state and a second value of the bit indicates a second TCI state. In other words, the UE associated each of the determined region to indicated TCI states in a dynamic manner based on the indication of bitmap for each region, where "0" means not associated, and "1" means associated. It is noted that that this pattern signaling is only exemplary. The bitmap may be provided with each bit representing a PRG (which corresponds to the case in which the region size is 1 PRG. In general, this fourth example provides the highest flexibility on one hand, but requires also some additional resources for signaling the bitmaps.

In order to provide a trade-off between the flexibility and the signaling effort, there may be mixed solutions. For instance, the bitmaps are statically defined and associated respectively with indices which are then signaled semi-statically from the base station to the UE. It is noted that such indexing of different schemes is not limited to bitmap representation. For example, two patterns such as the round-robin pattern (see the first example above) and the continuous pattern (see second example above) may be both statically defined (by standard or operator) as configurable and associated with respective indices (e.g., 0 and 1). Then, the base station configured the regions and indicates the configured scheme by signaling its index within an RRC message or the like. For even more flexibility, the index may be signaled in the DCI in some embodiments.

Alternatively, there may be more than one patterns signaled (pre-configured) semi-statically, for instance in form of a bitmap or by reference to some predefined (e.g., in standard) indexing of different patterns. Dynamic switching between such pre-configured patterns may then be possible by means of the DCI, e.g., as index to the respective one of the pre-configured patterns. Such index is signaled, for example, dynamically in the DCI either as a field, or as a codepoint jointly coded with other one or more parameter(s).

D. Region Size

According to a first example, the processor (770 and/or 730), when in operation, configures size of each region as a fixed size common for all regions of all TCI states. In other words, UE is statically configured with a common fixed value for each of the regions. For example, each region may have a size of one PRG. However, the region size may also be fixedly set to more than one PRG. Static configuration means that the standard defines the length of the region (in terms of number of PRGs) or the network operator defines it. In general, static configuration means that no reconfiguration is possible for an established data bearer.

According to a second example, the processor (770 and/or 730), when in operation, configures size of each region according to a semi-static signaling received by the transceiver and specifying a size common for all regions of all TCI states or specifying, for each TCI state, a size common to all regions of that TCI state.

In other words, the UE is semi-statically configured (by the base station) with a common fixed value for each of the regions via RRC signaling. The first possibility of having one common size for all regions of all TCI states saves signaling resources. The second possibility of configuring different region sizes for different respective TCI states provides more flexibility and is particularly suitable for the cases in which different TCI states are configured with different MCSs.

According to a third example, the processor, in operation determines size of each region from said DCI by one or more of:

obtaining from the DCI absolute size in terms of said multiple of PRGs, obtaining from the DCI a ratio between the sizes of regions belonging to different TCI states, obtaining from the DCI transport block sizes for the respective regions belonging to different TCI states and determining the size of the regions based on the transport block size, dividing the total number of PRGs according to the resource assignment by the number of regions.

For example, the UE dynamically determines the size of each region based on dynamic indication via DCI. Such indication may directly include the size (absolute size), or may indicate the size by means of an index associated with that size. For example, the region size may be a part of region configuration further including pattern, number of regions or the like. Such configurations may be listed in a table and associated with respective indices which may then be indicated in a DCI. Any other signaling of the size within the DCI is possible.

The UE may be indicated with the absolute size in terms of multiples of PRGs or with any other indication of the size for each TCI states separately or commonly for all TCI states, as already mentioned above with reference to semi-static signaling.

For instance, the UE may be indicated a ratio between the sizes for each of the regions via DCI signaling. One of the regions may be signaled by means of absolute size and the rest may be signaled as ratio or as difference. There are further possibilities, as is clear for those skilled in the art, so that the present disclosure is not limited by any of these examples.

In another exemplary implementation, the UE determines the size of each of the regions based on the TB size associated with each region which can be calculated based on separate MCSindication for respective TCI states. The TB size may be obtained from the MCS, modulation may also be considered for the determination. MCS is typically indicated by an MCS index into an MCS table which includes combinations of modulation (order) and transport block size (corresponding to the code rate).

According to another exemplary implementation, the UE (and, correspondingly the base station) determines the size of each of regions by simply dividing the total number of PRGs by the total number of regions. In this example, the region size is assumed to be the same for all TCI states. However, this determination may be also combined with signaling the ratio between the sizes of regions pertaining to different TCI states to obtain the sizes, or the ratio may be defined/derived in dependence on the MCS.

It is noted that above, the determination of regions and mapping were different steps A to D, but this is merely exemplary and actually, the mapping of TCI states may be described/defined directly onto PRGs. For example, once the size of a region is known, e.g., M, then the TCI states are assigned cyclically each TCI state to M PRGs. Thus, the present disclosure is not limited to any particular way in which the mapping of transmissions pertaining to different TRPs onto PRGs is performed, as long as the result is achieved (cf, e.g., the mappings of FIGS. 13 to 17.

Figure 10:
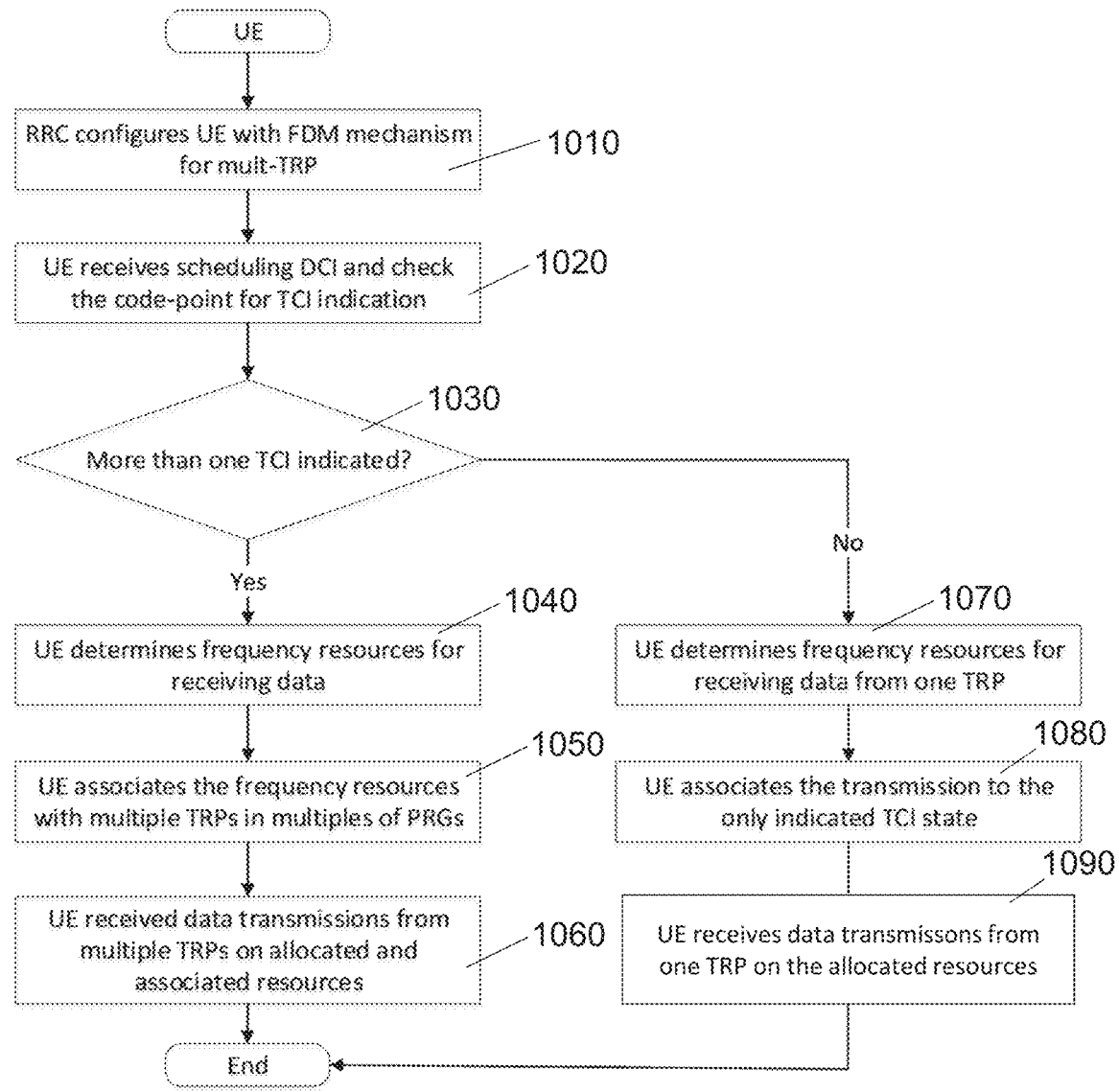
FIG. 10 is a flow diagram showing an exemplary method performed at a UE.

FIG. 10 illustrates a method according to an embodiment. The method is to be performed at the UE and starts with reception of RRC signaling in step 1010, which configures the UE with an FDM mechanism for multi-TRP reception and/or transmission of data. The RRC signaling is received from the network and may include any parameters for configuring the regions, e.g., their size, location, number and assignment to PRGs and to TCI states. For example, the base station may configure via the RRC the UEs in its cell. In step 1020, the UE receives scheduling DCI and checks the codepoint of the relevant bit-field in the DCI for the TCI indicator. In particular, in order to receive the DCI, the UE may monitor a preconfigured CORESET (control resources) and perform blind decoding in order to determine whether or not there is a DCI addressed to the UE. When there is such DCI detected, the UE parses the parameters signaled in the DCI. According to the present disclosure, the parameters include the TCI indicator which indicates at least whether or not there id one or more TCI state configured. In some embodiments, the TCI indicator may also indicate the number of TCI states configured. After extracting from the DCI the TCI indicator, in step 1030 it is assessed (evaluated/judged), whether or not more than one TCI state is configured (indicated by the TCI indicator).

If there are more than one TCI states indicated in step 1030, the steps 1040 to 1060 are performed. In particular, in step 1040, the UE determines frequency resources for receiving data. This may be performed by extracting from the DCI the frequency-domain assignment. However, the present disclosure is not limited thereto, and the resources may be defined semi-permanently by some previously received DCI and/or at least in part semi-statically. Then, in step 1050, the UE associates the determined frequency resources with the multiple TRPs with granularity of multiples of PRGs. Here, the multiple may be one or more times (integer multiple) of the PRG. Finally, in step 1060, the UE receives data transmissions from the multiple TRPs on the allocated and associated resources. In this example it is assumed that the scheduling DCI was a DCI scheduling transmissions in the downlink. However, as mentioned above, the present disclosure is applicable to uplink, in addition or alternatively to the downlink. It is noted that the present disclosure may also be applicable to sidelink.

If there are not more than one TCI states indicated in step 1030, then steps 1070 to 1090 are performed. In step 1070, the UE determines frequency resources for receiving data from one TRP. Following step 1070, in step 1080, the UE associates the transmission to the single TCI state indicated. Finally, in step 1090, the UE receives data transmissions from the one TRP on the allocated resources.

Figure 11:
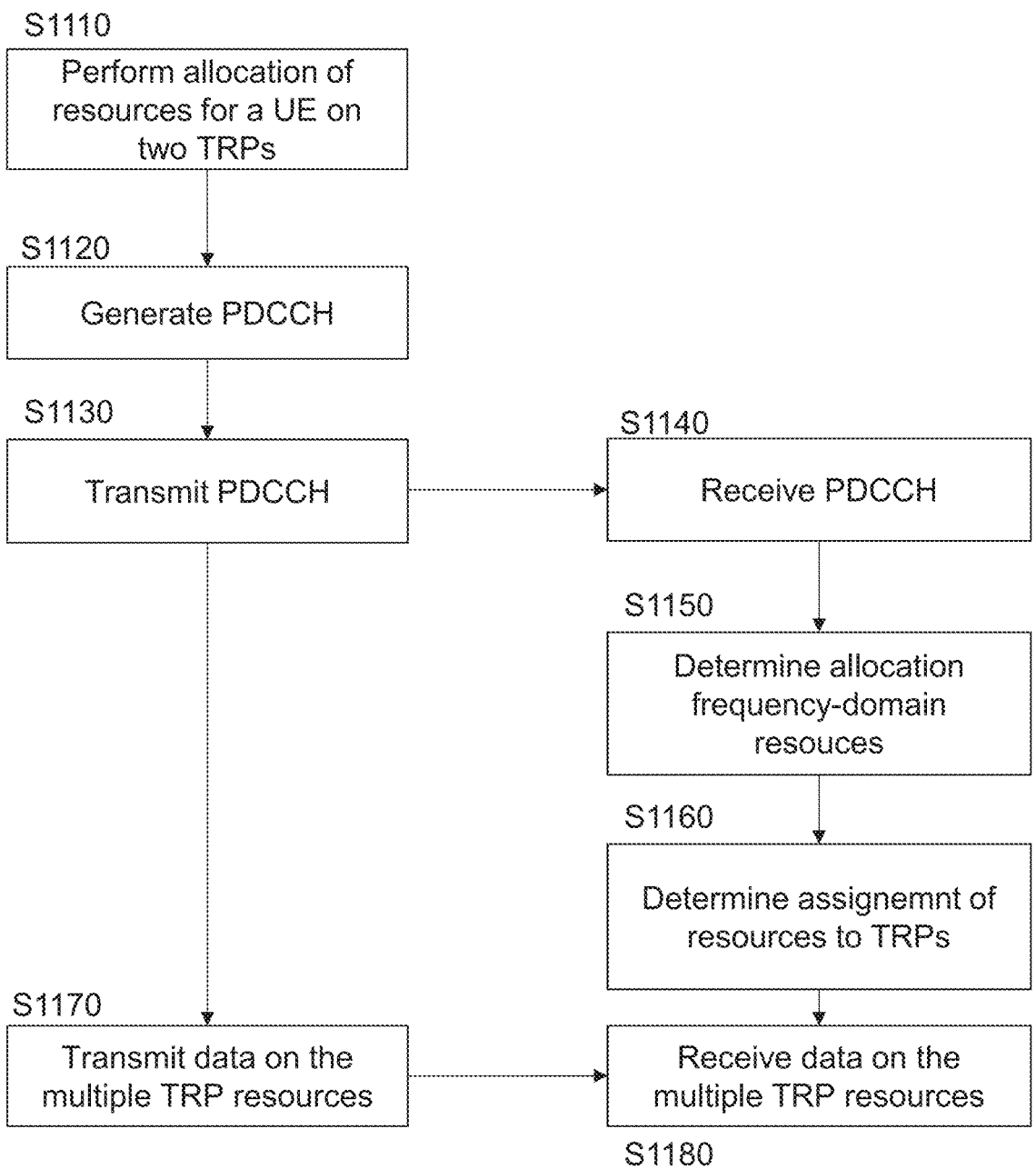
FIG. 11 is a flow diagram showing exemplary methods for communication performing at a UE side and a network side.

FIG. 11 illustrates the methods performed at both, a UE and a base station which are in communication with each other.

A method performing at the base station may comprise step S1110 in which the base station performs scheduling and allocates resources to the UE on two or more TCI states (TRPs). In accordance with the allocation, in step S1120, the base station generates a DCI carried on the PDCCH in a manner so as to provide within the DCI signaling a Transmission Configuration Indication, TCI, indicator specifying that two or more TCI states are configured; and a frequency-domain resource assignment indicating frequency-domain resources allocated for the two or more TCI states. In order to map the transmission of data properly onto the resources, the base station determines for each TCI state of the two or more TCI states one or more regions in frequency domain, each region having an integer multiple of a precoding resource block group, PRG, said integer being equal to or larger than 1, wherein regions of different TCI states do not overlap. In step S1130, the base station transmits the PDCCH including the generated DCI. Finally, the base station transmits, in step S1170 for each TCI state data on the frequency-domain resources in the determined frequency-domain region.

Correspondingly, the method at the UE comprises the step S1140 of receiving downlink control information, DCI, signaling with the PDCCH. In step S1150, the UE obtains from the DCI signaling a Transmission Configuration Indication, TCI, indicator specifying that two or more TCI states are configured; and a frequency-domain resource assignment indicating frequency-domain resources allocated for the two or more TCI states. In step S1160, the UE determines for each TCI state of the two or more TCI states one or more regions in frequency domain, each region having an integer multiple of a precoding resource block group, PRG, said integer being equal to or larger than 1, wherein regions of different TCI states do not overlap. Accordingly, in step S1180, the UE receives for each TCI state (TRP) data on the frequency-domain resources in the determined frequency-domain region.

When referring to frequency-domain resources, in this disclosure, frequency-domain resources of one or more symbols (OFDM or DFT-S-OFDM, or the like depending on the uplink/downlink specification of the physical layer technology) are meant. Typically, the DCI would carry (or its timing imply) particular time-domain resources to which the scheduling carried in the DCI applies.

In the following, some particular embodiments are provided for exemplary purposes, to illustrate some of the combinations of previously described region determination parts A to D. It is noted that these embodiments are not to limit the disclosure.

Embodiment 1

The UE (as well as the base station) divides PRBs in frequency domain into multiple regions of equal size wherein the size of each region is statically configured to be equal to 1 PRG. The number of super-regions is equal to the number of configured TCI states. Semi-static association between regions and TCI states is performed in a round-robin manner, and as a consequence, the regions with same index number (i.e., allocated to the same TCI state) are non-contiguously allocated in the frequency domain on the resources allocated by the frequency-domain resource assignment carried by the DCI.

One of the advantages of Embodiment 1 is that it does not require any additionally signaling and just relies on this new procedure that will be configured to the UE and will be applied when more than one TCI state is indicated by the TCI indicator. By the non-contiguous allocation, Embodiment 1 can provide maximum frequency diversity for the UE.

On the other hand, this Embodiment also provides some limitations. This embodiment's main use case is when the same MCS is to be used for transmission from different TRPs and PRG size of either 2 or 4 are indicated by DCI. Semi-static association means that even the unavailable regions could be associated with a TRP and the actual transmission will happen only on available regions so an effective association sequence with TRPs may not be round-robin.

Figure 12:
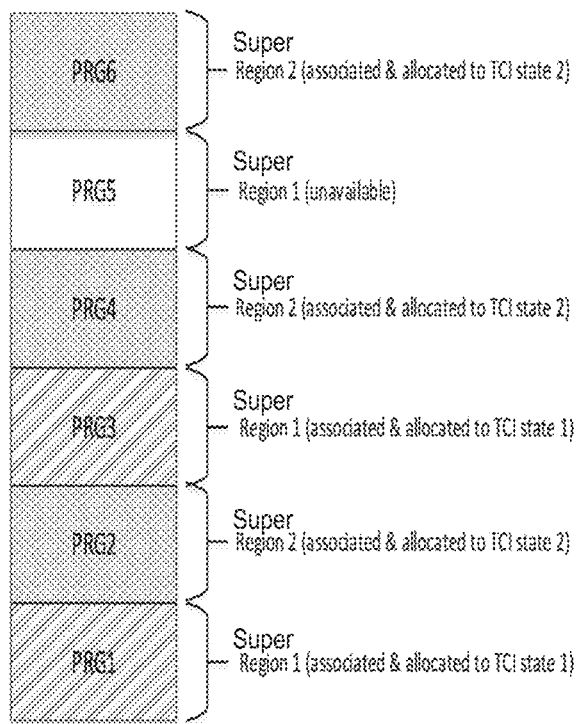
FIG. 12 is a schematic drawing which shows a first exemplary mapping of regions into precoding resource groups.

FIG. 12 illustrates an example of regions according to Embodiment 1.

Two regions super-regions are defined, where super-region 1 is associated with TCI state 1 and super-region 2 is associated with TCI state 2. Each super-region has 1 contiguous PRG and overall associated in round-robin manner to each TCI state. Therefore, the overall super-region is non-contiguous. In this example, PRG5 of the region is unavailable possibly due to allocation to some other UE. As can be seen in FIG. 12, since the assignment between the regions and the TCI states is performed before the actual resource allocation, PRG5 belongs to super region 1, but cannot be allocated/used for TCI state 1. Both, PRG4 and PRG6 belong to super region 2 and thus to TCI state 2.

Embodiment 2

Figure 13:
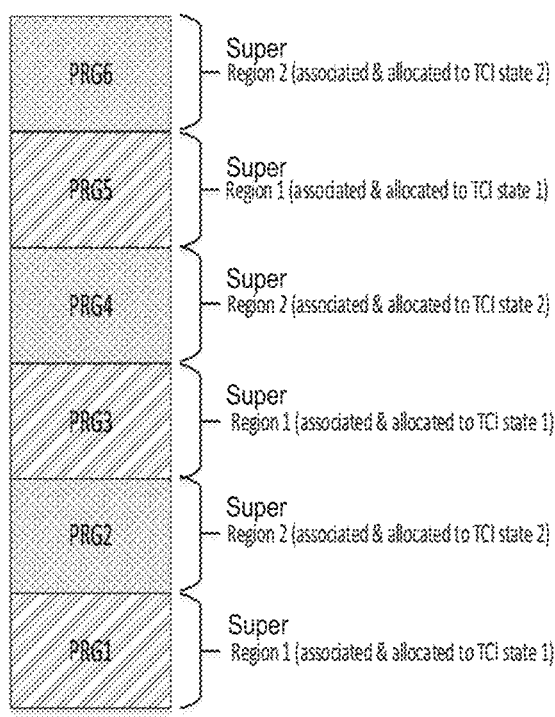
FIG. 13 is a schematic drawing which shows a second exemplary mapping of regions into precoding resource groups.

This embodiment is illustrated in FIG. 13. In particular, the UE (corresponding to the configuration provided and also followed by the base station) divides PRGs in frequency domain into multiple regions of equal size. The size of a region is statically configured to be equal to 1 PRG, and common to all regions of all TCI states. The number (amount) of regions is equal to the number of the indicated TCI states, i.e., TCI states indicated by the DCI within the TCI indicator (e.g., within a codepoint of the corresponding bit-field). The dynamic association between the regions and the TCI states is performed in a round-robin manner. Accordingly, the regions pertaining to one TCI state are non-contiguously allocated in the frequency domain.

Here the association is done in a dynamic manner which means that only available resources are considered for creating regions and associating with TCI states. This may provide advantages of efficient resource utilization. One of suitable use cases for this embodiment may be when the same MCS is to be used for transmission from different TRPs and PRG size of, for instance, 2 or 4 are indicated by the DCI.

As can be seen in FIG. 13, two super-regions are defined (denoted in FIG. 13 as Region 1 and Region 2), where PRGs denoted as Super Region 1 are associated with TCI state 1 and PRGs denoted as Super Region 2 are associated with TCI state 2. Each region of Super region 1 as well as Super Region 2 has 1 contiguous PRG. Regions are overall associated in round-robin manner to each TCI state and therefore the association of the regions to the TCI states is overall non-contiguous. Region 1 corresponds to PRG1, region 2 corresponds to PRG 2, region 3 corresponds to PRG3, etc.

All associated regions are also allocated because the association is performed dynamically, only on the allocated resources, i.e., resources specified in the DCI's frequency-domain assignment.

Embodiment 3

Figure 14:
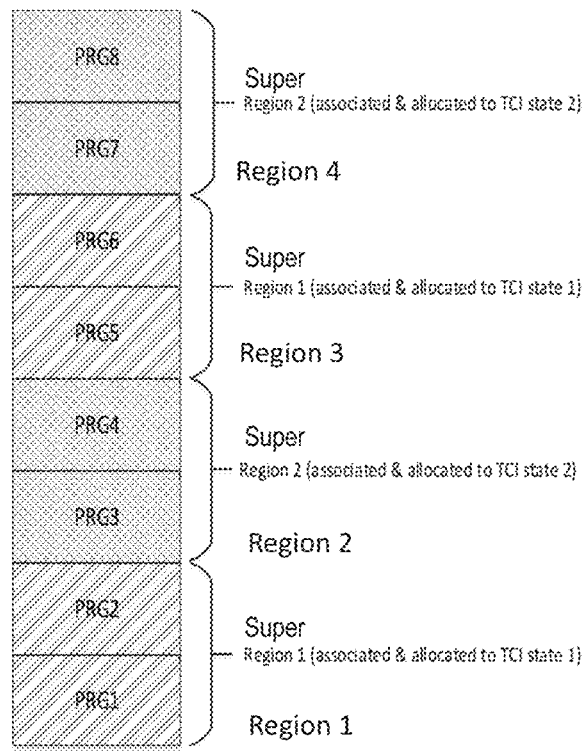
FIG. 14 is a schematic drawing which shows a third exemplary mapping of regions into precoding resource groups.

Embodiment 3 is illustrated in FIG. 14. Accordingly, the UE (correspondingly to the configuration adopted by the base station) divides PRBs in frequency domain into multiple regions of equal size. The size of region is configured semi-statically, by RRC protocol. The number of super regions is equal to the number of indicated TCI states, which is 2 in this example. Dynamic association between regions and TCI states is done in a round-robin manner resulting in super-regions being non-contiguously allocated. Dynamic indication of size of region can be either explicitly indicated with a new bit field or implicitly along with nominal RBG size indication.

This is illustrated in the following Table 2, which is a modification of Table 1 described above. Accordingly, the values in the brackets are exemplary region sizes associated with the RBG size. For instance, for bandwidth part size between 73 and 144, in configuration 1, the size of an RBG is 8 RBs and the size of a region is 2 PRGs. It is noted that this table representation is only exemplary to illustrate that there may be a relation between the RBG size defined by standard (or even configurable by semi-static signaling) and between the region size. Such relation can be specified in a manner different from this table and independently of it. An advantage of such implicit relation is reduction of signaling overhead for the purpose of region size signaling.

TABLE 2

| Bandwidth Part Size | Configuration 1 | Configuration 2 |
|---|---|---|
| 1-36 | 2 (1) | 4 (2) |
| 37-72 | 4 (2) | 8 (2) |
| 73-144 | 8 (2) | 16 (2) |
| 145-275 | 16 (4) | 16 (4) |

In FIG. 14, two super regions are defined, where super region 1 is associated with TCI state 1 and super region 2 is associated with TCI state 2. Each region has indicated size of 2 PRGs_and the regions are associated in round-robin manner to each TCI state, resulting in non-contiguous resource distribution for each TCI state. FIG. 14 shows four Regions 1 to 4, among which Region 1 and Region 3 form super region 1, whereas Region 2 and Region 4 form super region 2. Super region 1 is associated with TCI state 1, whereas super region 2 is associated with TCI state 2.

This embodiment is relatively flexible as the size of region is not fixed to 1 PRG. In this example, the size of the region is 2 PRGs. However, as mentioned above, the size may generally be indicated depending up on desired frequency diversity. The indication may be provided for all regions. One of use cases in which this embodiment may provide advantageous implementation is when same MCS is to be used for transmission from different TRPs and, for example, PRG size of either 2 or 4 is indicated by DCI. In order to make this embodiment also suitable for MCS being different for different TCI states, the region size indication may be provided per TCI state.

Embodiment 4

In this embodiment, the number of regions (as well as number of super regions in this case) is equal to the number of the indicated TCI states. Accordingly, the UE divides PRGs in frequency domain into multiple regions of equal size (or, in general, substantially equal size in cases the number of PRGs is not integer divisible by the number of TCI states). Dynamic association between regions and TCI states is done in a round-robin manner. In this embodiment, each region is contiguously allocated and the size of region is calculated by dividing total PRGs by number of regions. This embodiment may be beneficial especially when precoding granularity is wideband so that a contiguous allocation is more suitable.

Figure 15:
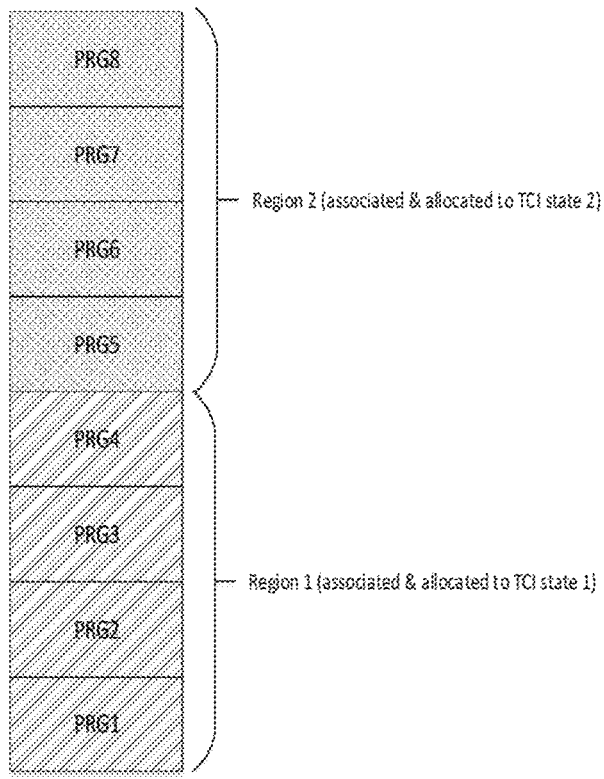
FIG. 15 is a schematic drawing which shows a fourth exemplary mapping of regions into precoding resource groups.

Embodiment 4 is illustrated in FIG. 15. As can be seen, two regions are defined, where region 1 is associated with TCI state 1 and region 2 is associated with TCI state 2. Each region is defined by dividing the total available PRGs into these 2 parts, each associated with the separate TCI state. Each super-region corresponds to the respective region and thus has only contiguous allocation of PRGs.

Embodiment 5

According to Embodiment 5, the UE divides PRBs in frequency domain into multiple regions of different sizes.

The size for the regions is explicitly indicated to the UE in terms of either absolute values or ratio(s) of size of the regions.

For example if 2 and 4 are explicit (absolute) sizes indicated for the respective regions of TCI state 1 and TCI state 2, then region 1 associated with TCI state 1 has contiguously 2 PRGs and region 2 associated with TCI state 2 has contiguously 4 PRGs. If ratio such as (1:2) is indicated, then region 1 associated with TCI state 1 has contiguously 1 PRG and region 2 associated with TCI state 2 has contiguously 2 PRGs. In this embodiment, the number of super-regions is equal to the number of configured TCI states. Dynamic association between regions and TCI states is done in a round-robin manner, so that the super-regions are non-contiguously allocated. This embodiment provides flexibility to support even the case of unequal sizes between different regions when different TBS is transmitted from different TRPs.

Embodiment 6

In this embodiment, the UE (and correspondingly the base station) divides PRBs (in particular PRGs) in frequency domain into multiple regions of different sizes. In particular, the size for each region is calculated based on the indication of different MCSs for different TRPs. Let us assume that a first TRP is configured with MCS1 and a second TRP is configured with MCS2, wherein the MCS1 and MCS2 differ from each other.

For example, if MCS1 and MCS2 values are within a certain threshold, then size of region ratio is calculated as (1:1). The threshold is a threshold for difference between the MCS1 and MCS2. If MCS1>MCS2 (or vice versa) and the difference between them (MCS1-MCS2 and/or MCS2-MCS1, e.g., absolute difference) above the certain threshold, then the size of region ratio is calculated as (1:2).

The number of super regions is equal to the number of configured TCI states. Dynamic association between regions and TCI states is done in a round-robin manner. Thus, super regions are non-contiguously allocated.

This embodiment calculates ratio of sizes between different regions bases on indicated MCS for different TRPs and therefore no explicit signaling needed, resulting I a more efficient resource utilization.

Figure 16:
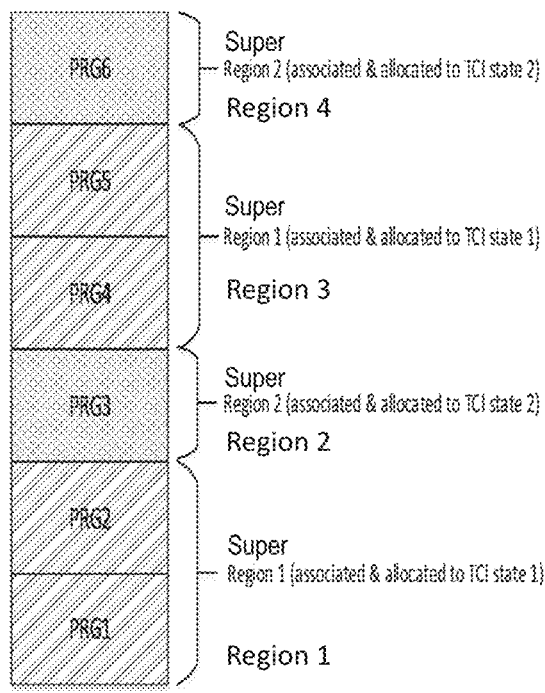
FIG. 16 is a schematic drawing which shows a fifth exemplary mapping of regions into precoding resource groups.

FIG. 16 shows an example of regions according to this embodiment. Two super regions are defined, where super region 1 is associated with TCI state 1 and super region 2 is associated with TCI state 2. Ratio of sizes between region 1 and region 2 is indicated or determined as (2:1) that means region 1 (pertaining to super-region 1) has 2 contiguous PRGs and region 2 (pertaining to super-region 2) has 1 contiguous PRG. Overall resources associated with each TCI state are unequal in this embodiment.

Embodiment 7

In this embodiment, UE (also base station) divides PRBs (thus also PRGs) in frequency domain into multiple regions of equal size. The size of a region is statically configured to be equal to 1 PRG. The number of super-regions is equal to the number of configured TCI states. Dynamic association between regions and TCI states is done in two steps when different TB sizes are transmitted from different TRPs. Association between regions and TCI states in first done in a round-robin manner until the lowest TB size associated with one of the TCI state is fully allocated. After the lowest TB size (here 1 PRG) is fully allocated, then the remaining regions are contiguously associated with the TCI state with the highest TB size. Also in this case, super-regions are non-contiguously allocated. This embodiment is simpler, as calculation is required related to calculation of ratio of sizes between different regions.

Figure 17:
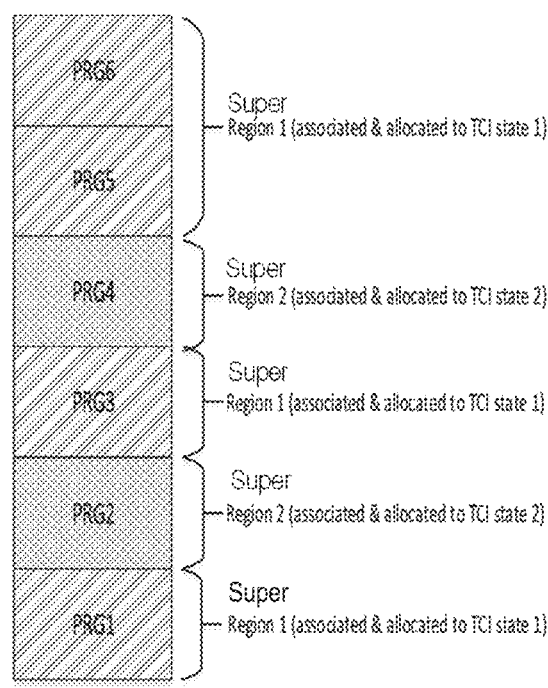
FIG. 17 is a schematic drawing which shows a sixth exemplary mapping of regions into precoding resource groups.

FIG. 17 illustrates an example of this embodiment. Two regions are defined, where region 1 is associated with TCI state 1 and region 2 is associated with TCI state 2. Region 1 and region 2 are defined in round-robin manner (1 PRG each) until the lower TBS associated with region 2 is allocated, then all the remaining (allocated) PRGs are contiguously allocated with region 1 since it has higher TBS. Overall resources associated with each TCI state are unequal.

The present disclosure can be realized by software, hardware, or software in cooperation with hardware. Each functional block used in the description of each embodiment described above can be partly or entirely realized by an LSI (Large Scale Integration) such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

In summary, a user equipment, UE, is provided in a first embodiment, comprising: a transceiver, which in operation, receives downlink control information, DCI, signaling; a processor, which in operation: obtains from the DCI signaling: a Transmission Configuration Indication, TCI, indicator specifying that two or more TCI states are configured; and a frequency-domain resource assignment indicating frequency-domain resources allocated for the two or more TCI states, determines for each TCI state of the two or more TCI states one or more regions in frequency domain, each region having an integer multiple of a precoding resource block group, PRG, said integer being equal to or larger than 1, wherein regions of different TCI states do not overlap, wherein the transceiver, in operation, receives or transmits for each TCI state data on the frequency-domain resources in the determined frequency-domain region.

In a second embodiment, in addition to the first embodiment, the processor, in operation, determines a number of regions according to maximum number of TCI states which is configured semi-statically as possible to be indicated by one TCI in the DCI.

In a third embodiment, in addition to the first embodiment, the processor, in operation, determines a number of regions according to maximum number of TCI states which is indicated by said TCI indicator.

In a fourth embodiment, in addition to the first or second embodiment, the processor, in operation, assigns the regions to the respective integer multiples of PRGs in a semi-static manner, without considering dynamic resource allocation based on said DCI.

In a fifth embodiment, in addition to the first or third embodiment, the processor, in operation, assigns the regions to the respective integer multiples of PRGs in accordance with said frequency-domain resource assignment.

In a sixth embodiment, in addition to any of the first to fifth embodiment, the processor, in operation, associates the regions to the two or more TCI states according to a pre-configured pattern.

In a seventh embodiment, in addition to the sixth embodiment, the pre-configured pattern is received within semi-static or dynamic signaling as a bitmap with each bit of the bitmap representing a region, a first value of a bit indicates a first TCI state and a second value of the bit indicates a second TCI state.

In an eighth embodiment, in addition to the sixth embodiment, the pre-configured pattern corresponds to round robin by alternating TCI state after each integer number M of consecutive regions, wherein M is not smaller than 1.

In a ninth embodiment, in addition to the eighth embodiment, the processor, in operation, associates a first part of the consecutive regions to the two or more TCI states according to said round robin and a second part of the consecutive regions to one of the TCI states.

In a tenth embodiment, in addition to any of the first to sixth embodiment, the processor, in operation, sequentially associates consecutive regions to each of the two or more TCI states.

In an eleventh embodiment, in addition to any of the first to ninth embodiment, the processor, in operation configures size of each region: (i) as a fixed size common for all regions of all TCI states; (ii) or according to a semi-static signaling received by the transceiver and specifying: a size common for all regions of all TCI states; or for each TCI states a size common to all regions of that TCI state.

In a twelfth embodiment, in addition to any of the first to ninth embodiment, the processor, in operation determines size of each region from said DCI by one or more of: (i) obtaining from the DCI absolute size in terms of said multiple of PRGs, (ii) obtaining from the DCI a ratio between the sizes of regions belonging to different TCI states, (iii) obtaining from the DCI transport block sizes for the respective regions belonging to different TCI states and determining the size of the regions based on the transport block size, and (iv) dividing the total number of PRGs according to the resource assignment by the number of regions.

According to thirteenth embodiment, s scheduling device is provided, comprising a transceiver, which in operation, transmits downlink control information, DCI, signaling; a processor, which in operation: provides within the DCI signaling: a Transmission Configuration Indication, TCI, indicator specifying that two or more TCI states are configured; and a frequency-domain resource assignment indicating frequency-domain resources allocated for the two or more TCI states, determines for each TCI state of the two or more TCI states one or more regions in frequency domain, each region having an integer multiple of a precoding resource block group, PRG, said integer being equal to or larger than 1, wherein regions of different TCI states do not overlap, wherein the transceiver, in operation, transmits or receives for each TCI state data on the frequency-domain resources in the determined frequency-domain region.

According to fourteenth embodiment, a method is provided comprising: receiving downlink control information, DCI, signaling; obtaining from the DCI signaling: a Transmission Configuration Indication, TCI, indicator specifying that two or more TCI states are configured; and a frequency-domain resource assignment indicating frequency-domain resources allocated for the two or more TCI states, determining for each TCI state of the two or more TCI states one or more regions in frequency domain, each region having an integer multiple of a precoding resource block group, PRG, said integer being equal to or larger than 1, wherein regions of different TCI states do not overlap, receiving or transmitting for each TCI state data on the frequency-domain resources in the determined frequency-domain region.

According to fifteenth embodiment, a method is provided comprising: transmitting downlink control information, DCI, signaling; providing within the DCI signaling: a Transmission Configuration Indication, TCI, indicator specifying that two or more TCI states are configured; and a frequency-domain resource assignment indicating frequency-domain resources allocated for the two or more TCI states, determining for each TCI state of the two or more TCI states one or more regions in frequency domain, each region having an integer multiple of a precoding resource block group, PRG, said integer being equal to or larger than 1, wherein regions of different TCI states do not overlap, transmitting or receiving for each TCI state data on the frequency-domain resources in the determined frequency-domain region.

It is noted that second to twelfth embodiments are correspondingly applicable to the scheduling device of the thirteenth embodiment. Moreover, the steps performed by the circuitry in operation as well as the steps of the transceiver referred to in the above UE and base station embodiments correspond to the respective methods.

In addition, a non-transitory medium is provided storing program instructions which, when executed on a processing circuitry such as a general purpose processor perform all steps of any of the the above mentioned method embodiments.

Summarizing, the present disclosure relates to a user equipment, UE, and a scheduling node, as well as to the corresponding methods. In particular, a downlink control information, DCI, signaling carries a Transmission Configuration Indication, TCI, indicator specifying that two or more TCI states are configured and a frequency-domain resource assignment indicating frequency-domain resources allocated for the two or more TCI states. For each TCI state of the two or more TCI states, one or more regions in frequency domain is/are determined, each region having an integer multiple of a precoding resource block group, PRG, said integer being equal to or larger than 1, wherein regions of different TCI states do not overlap. The data are received or transmitted for each TCI state on the frequency-domain resources in the determined frequency-domain region.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE), comprising:
    a transceiver, which in operation, receives downlink control information (DCI) signaling;
    a processor, which in operation:
    obtains from the DCI signaling:
        a Transmission Configuration Indication (TCI) indicator specifying that two or more TCI states are configured; and
        a frequency-domain resource assignment indicating frequency-domain resources allocated for the two or more TCI states, and
    determines for each TCI state of the two or more TCI states one or more regions in frequency domain, each region having an integer multiple of a precoding resource block group (PRG), said integer being equal to or larger than 1, wherein regions of different TCI states do not overlap,
    wherein the processor, in operation, determines a number of regions according to a number of the TCI states which is indicated by a codepoint of said TCI indicator, and the transceiver, in operation, receives or transmits for each TCI state data on the frequency-domain resources in the determined frequency-domain region(s).

2. The user equipment of claim 1, wherein the processor, in operation, determines the number of regions according to a maximum number of TCI states which is configured semi-statically.

3. The user equipment according to claim 1, wherein the processor, in operation, assigns the regions to the respective integer multiples of PRGs in a semi-static manner, without considering dynamic resource allocation based on said DCI.

4. The user equipment according to claim 1, wherein the processor, in operation, assigns the regions to the respective integer multiples of PRGs in accordance with said frequency-domain resource assignment.

5. The user equipment according to claim 1, wherein the processor, in operation, associates the regions to the two or more TCI states according to a pre-configured pattern.

6. The user equipment according to claim 5, wherein the pre-configured pattern is received within semi-static or dynamic signaling as a bitmap with each bit of the bitmap representing a region, a first value of a bit indicates a first TCI state and a second value of the bit indicates a second TCI state.

7. The user equipment according to claim 5, wherein the pre-configured pattern corresponds to round robin by alternating TCI state after each integer number M of consecutive regions, wherein M is not smaller than 1.

8. The user equipment according to claim 7, wherein the processor, in operation, associates a first part of the consecutive regions to the two or more TCI states according to said round robin and a second part of the consecutive regions to one of the TCI states.

9. The user equipment according to claim 1, wherein the processor, in operation, sequentially associates consecutive regions to each of the two or more TCI states.

10. The user equipment according to claim 1, wherein the processor, in operation, configures size of each region:
    as a fixed size common for all regions of all TCI states; or
    according to a semi-static signaling received by the transceiver and specifying:
        a size common for all regions of all TCI states; or
        for each TCI states a size common to all regions of that TCI state.

11. The user equipment according to claim 1, wherein the processor, in operation, determines size of each region from said DCI by one or more of:
    obtaining from the DCI absolute size in terms of said multiple of PRGs,
    obtaining from the DCI a ratio between the sizes of regions belonging to different TCI states,
    obtaining from the DCI transport block sizes for the respective regions belonging to different TCI states and determining the size of the regions based on the transport block size, and
    dividing the total number of PRGs according to the resource assignment by the number of regions.

12. A scheduling node, comprising:
    a transceiver, which in operation, transmits downlink control information (DCI) signaling;
    a processor, which in operation:
    provides within the DCI signaling:
        a Transmission Configuration Indication (TCI) indicator specifying that two or more TCI states are configured; and
        a frequency-domain resource assignment indicating frequency-domain resources allocated for the two or more TCI states, and determines for each TCI state of the two or more TCI states one or more regions in frequency domain, each region having an integer multiple of a precoding resource block group (PRG), said integer being equal to or larger than 1, wherein regions of different TCI states do not overlap, wherein the processor, in operation, determines a number of regions according to a number of the TCI states which is indicated by a codepoint of said TCI indicator, and the transceiver, in operation, transmits or receives for each TCI state data on the frequency-domain resources in the determined frequency-domain region(s).

13. A method comprising:

receiving downlink control information (DCI) signaling;
obtaining from the DCI signaling:
- a Transmission Configuration Indication (TCI) indicator specifying that two or more TCI states are configured; and
- a frequency-domain resource assignment indicating frequency-domain resources allocated for the two or more TCI states, determining for each TCI state of the two or more TCI states one or more regions in frequency domain, each region having an integer multiple of a precoding resource block group (PRG), said integer being equal to or larger than 1, wherein regions of different TCI states do not overlap, determining a number of regions according to a number of the TCI states which is indicated by a codepoint of said TCI indicator, and receiving or transmitting for each TCI state data on the frequency-domain resources in the determined frequency-domain region(s).

* * * * *